(No Model.) 2 Sheets—Sheet 1.
O. B. PECK.
PROCESS OF TREATING FINELY DIVIDED OR POWDERED SUBSTANCES OF DIFFERENT DEGREES OF SPECIFIC GRAVITY.
No. 468,688. Patented Feb. 9, 1892.
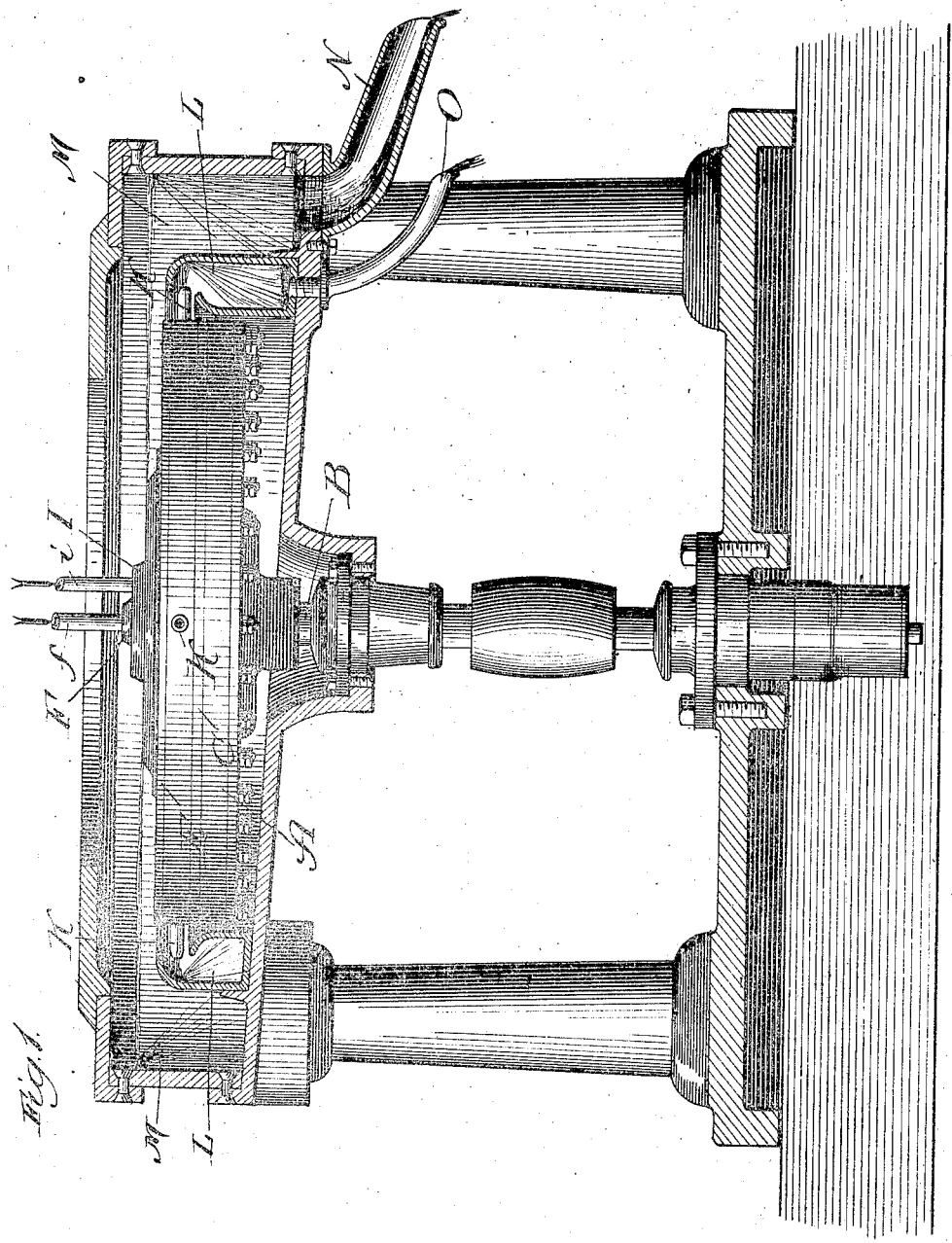

(No Model.) 2 Sheets—Sheet 2.
O. B. PECK.
PROCESS OF TREATING FINELY DIVIDED OR POWDERED SUBSTANCES OF DIFFERENT DEGREES OF SPECIFIC GRAVITY.
No. 468,688. Patented Feb. 9, 1892.
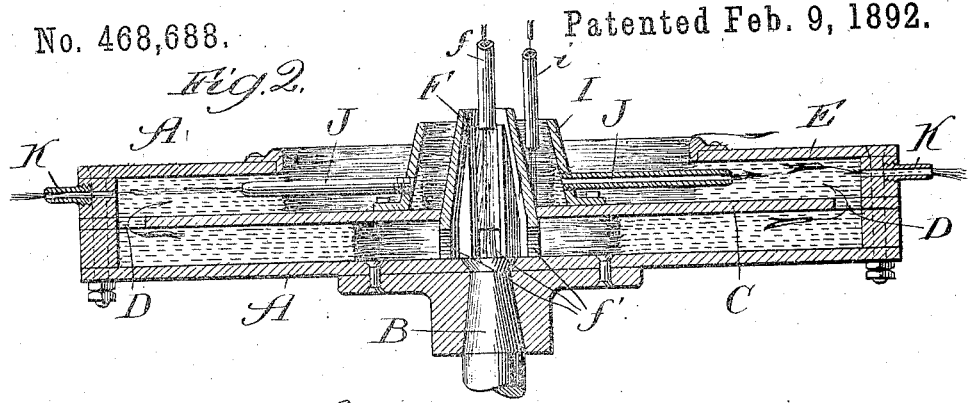
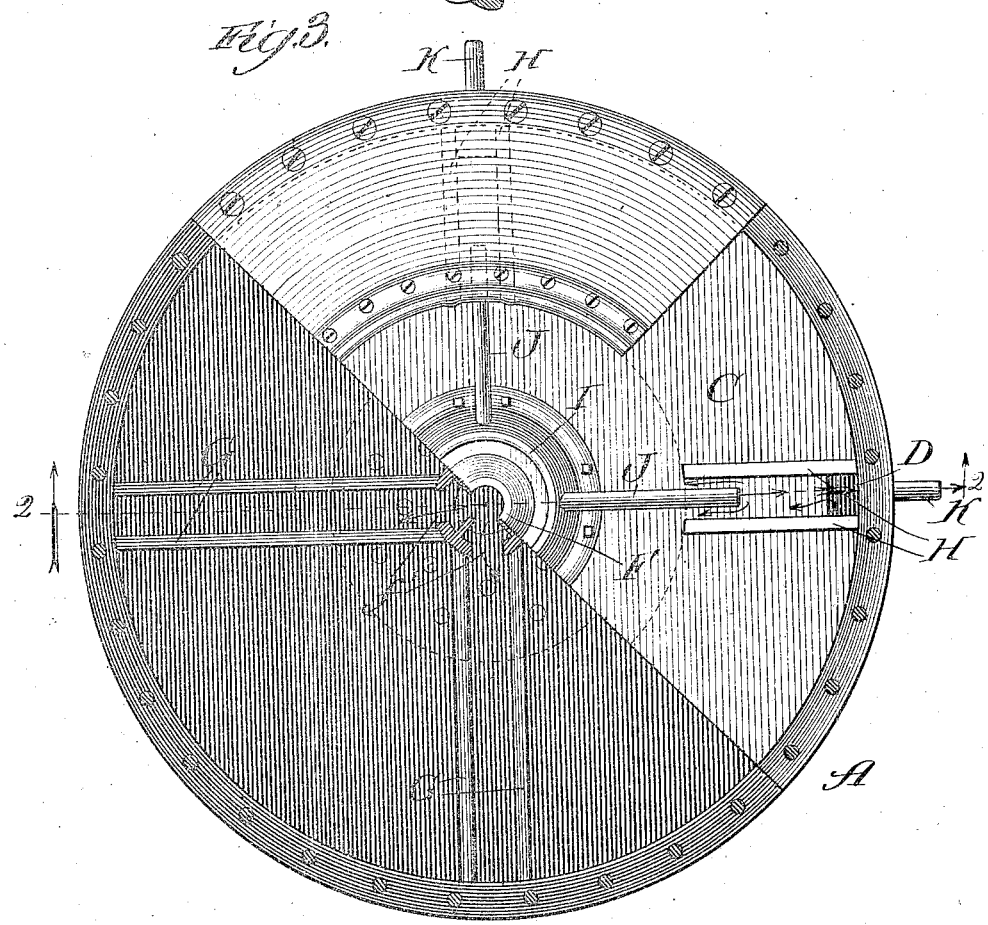
Witnesses:
Chas E Taylord
Clifford A White
Inventor:
Orrin B. Peck,
By Banning & Banning & Payson
Attys

UNITED STATES PATENT OFFICE.

ORRIN B. PECK, OF CHICAGO, ILLINOIS, ASSIGNOR TO MELINDA PECK, OF SAME PLACE.

PROCESS OF TREATING FINELY DIVIDED OR POWDERED SUBSTANCES OF DIFFERENT DEGREES OF SPECIFIC GRAVITY.

SPECIFICATION forming part of Letters Patent No. 468,688, dated February 9, 1892.

Application filed October 5, 1891. Serial No. 407,805. (No model.)

*To all whom it may concern:*

Be it known that I, ORRIN B. PECK, a citizen of the United States, residing at Chicago, Illinois, have invented a certain new and useful Process of Treating Finely Divided or Powdered Substances of Different Degrees of Specific Gravity, of which the following is a specification.

The object of my invention is to treat finely divided or powdered substances to separate the more valuable or those of greater specific gravity from the lighter or more worthless portions by projecting the material to be treated into an opposing current of water and subjecting such material to the action of centrifugal force while passing through or in contact with such opposing current of water; and my invention consists in the process and mode of operation hereinafter described and claimed.

In the drawings, Figure 1 represents a vertical transverse section of the apparatus by which I carry out or embody my process, with a part of the apparatus in elevation. Fig. 2 represents a vertical transverse section of the revoluble treatment-chamber, taken through the line 2 of Fig. 3, but with the chamber in its fully-completed condition; and Fig. 3 is a plan view of the revoluble treatment-chamber with a portion of the top removed, showing the horizontal dividing-plate, and also a portion of the horizontal dividing-plate removed, showing a portion of the bottom of the chamber, as hereinafter explained.

It will be understood that in the treatment of finely divided or powdered substances to separate the heavier and more valuable portions from the lighter and more worthless it is a difficult matter to effect the separation of the particles, although they really differ in degrees of specific gravity, from the fact that as such particles are extremely small the difference between their gravities is almost immeasurable and inappreciable, so that it is impracticable to apply or regulate the use of water to effect the separation of the particles unless their specific gravities have been increased or magnified, so to speak. As is well known, and as I have demonstrated by experience, the specific gravity of the particles may be practically increased or magnified by the action of centrifugal force sufficiently to make the difference between the heavier and the lighter particles appreciable; and I have found by experience that the particles while being thus acted upon by centrifugal force and thus magnified or increased as to their specific gravity may be separated, the lighter from the heavier, by subjecting them to an opposing current of water or other fluid of sufficient resistance to carry away the lighter particles, but of insufficient resistance to arrest the heavier particles, which, augmented by centrifugal force, will pass through the opposing current, so that a separation of extremely minute particles may be effected.

To carry out this process or mode of treatment I have devised the apparatus hereinafter described. I wish to say, however, that I do not wish to confine myself to specific forms or details of construction in the manufacture of the apparatus that I shall describe, but that the apparatus described is merely intended as a practical and convenient way of embodying or applying my process and that I recognize that it can be applied in different ways so far as the details of the apparatus are concerned.

In my present apparatus, A is a revoluble treatment-chamber intended to be mounted upon a shaft B, capable of being revolved by any convenient motive power, and to which as great a speed of revolution may be imparted as necessary to effect the desired object. I divide the treatment-chamber into two horizontal sections or apartments by means of a horizontal dividing-plate C, which may be arranged and supported in place by bolts or rivets, as shown in the drawings, or in any other convenient way. This dividing-plate is provided with openings D, preferably arranged at the outer edge of the chamber, affording communication between the upper and lower compartments of the treatment-chamber. These openings are preferably four in number, arranged opposite each other, although there may be any convenient number, as the constructor of the apparatus may desire. The treatment-chamber is covered by a top or cover E, that is intended to extend in as a rim or covering, inclosing the top of the treatment-chamber from the outer edges inward as far as desired. In practice I prefer to extend the cover in about half of the distance from the outer edge of the chamber to the center, as shown in Fig. 2, although this is a matter of construction in which as much latitude may be indulged as is suitable to the conditions under which the apparatus is intended to be operated. I arrange a central water-receiving aperture F, extending from the bottom of the treatment-chamber up a desired distance, to receive the desired supply of water, which is conducted into it through a pipe f from any convenient supply. This receiving-aperture is provided with holes or openings f'' between the bottom of the treatment-chamber and the horizontal dividing-plate C, through which the water from the pipe f may pass. These holes or openings are preferably four in number, arranged to correspond with the openings D, although there may be any desired number. I prefer to arrange between the bottom of the treatment-chamber and the dividing-plate vertical partitions G, forming passages or channels leading from the holes f' to the openings D to conduct the water to such openings to permit it to pass up through the dividing-plate into the upper compartment of the treatment-chamber. Similar vertical partitions H, arranged between the dividing-plate C and the cover E, form channels or passages from the openings D inwardly toward the center of the treatment-chamber. Around the water-receiving aperture F is arranged a material-receiving aperture I, that extends up from the dividing-plate D a desired distance to receive the material to be treated, which is flowed or delivered into the same through a pipe i, leading from any convenient source or supply. From this material-receiving aperture pipes J extend out into the channels or passages formed by the vertical partitions H and enter the same a desired distance, so that their outer or discharge ends will be under the cover E. Leading out from the passages or channels between the vertical partitions H are discharge pipes or spouts K, through which the heavier portions of the material treated are discharged by the action of centrifugal force. These spouts discharge the material passing through them into an annular trough or receptacle L, while the material that is carried out over the top of the treatment-chamber is discharged into the annular trough or receptacle M. Appropriate spouts N and O lead from these troughs or receptacles, as shown in Fig. 1, to carry away the water and waste particles and the portions of the material treated which it is desired to save and deliver them at any convenient point or desired vessel.

In operation the treatment-chamber is revolved at sufficiently high speed to develop as great a degree of centrifugal force as may be necessary to separate the heavier from the lighter particles of the material to be treated. A stream of water is admitted into the central water-receiving aperture and carried by the action of centrifugal force out along the channels or passages between the vertical partitions G and up through the openings D into the channels or passages formed by the vertical partitions H, whence the current or stream of water passes inward toward the center of the treatment-chamber to escape over the top or inner edge of the cover E. A stream of material to be treated is now turned into the material-receiving aperture I, to be carried by the action of centrifugal force out through the pipes J into the passages or channels formed by the partitions H. As the material is projected or thrown by the action of centrifugal force into these channels or passages, it comes into contact with the opposing current of water passing through such channels to escape over the top of the cover E. The amount of water introduced to form the opposing current is intended to be sufficient and to be driven at a sufficient velocity to arrest and carry off the lighter portions of the material being treated, but not to arrest or carry off the heavier portions, which are forced or projected through the current of water by the action of centrifugal force to the outer end of the passage or channel to escape through the delivery spouts or pipes K. Of course a certain quantity of water will also escape through these spouts with the heavier particles of the material being treated; but as they afford an exit much too small for the escape of the entire quantity of water introduced a constant current will be forced inward against the material being projected through the pipes J.

As I shall in this application only claim the process or mode of operation, I do not herein claim the novel features of construction of the apparatus shown and described, but make them the subject of another application filed contemporaneously with this one, Serial No. 407,806.

What I regard as new, and desire to secure by Letters Patent, is—

1. The process of treating and separating finely divided or powdered substances of different degrees of specific gravity, which consists in forcing such substances by the action of centrifugal force against an opposing current of water, substantially as described.

2. The process of treating and separating finely divided or powdered substances of different degrees of specific gravity, which consists in subjecting them to the action of centrifugal force in contact with an opposing current of water and discharging the heavier particles at a point farther from the center of the treatment-chamber than the point at which the main portion of the water and the lighter particles are discharged, substantially as described.

ORRIN B. PECK.

Witnesses:
THOMAS A. BANNING,
SAMUEL E. HIBBEN.